R. ILGNER.
MEDICAL APPLIANCE.
APPLICATION FILED AUG. 21, 1913.
1,199,731.
Patented Sept. 26, 1916.
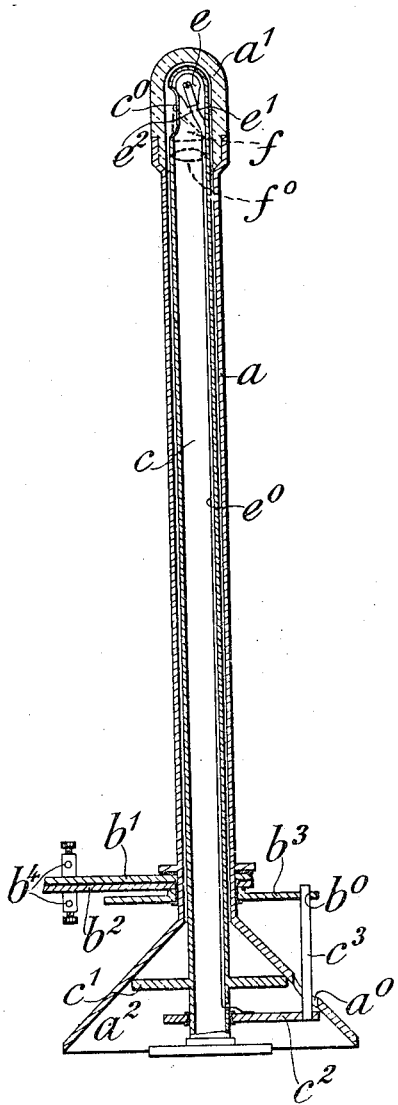

UNITED STATES PATENT OFFICE.

RUDOLF ILGNER, OF ELBING, GERMANY, ASSIGNOR TO THE FIRM OF GEORG WOLF, G. M. B. H., OF BERLIN, GERMANY.

MEDICAL APPLIANCE.

1,199,731.  Specification of Letters Patent.  Patented Sept. 26, 1916.

Application filed August 21, 1913. Serial No. 785,872.

*To all whom it may concern:*

Be it known that I, RUDOLF ILGNER, a citizen of the German Empire, residing at Elbing, Germany, have invented a new and useful Medical Appliance, of which the following is a specification.

The present invention relates to tubular systems for such instruments as hysteroscopes and for the inspection of cavities in the body, and more particularly to systems consisting of an outer tube, which is provided with a lateral window, and an inner tube, which may be inserted in the outer tube and which is intended for the reception of the parts of an optical system arranged for viewing laterally.

An arrangement, in which, as was usual up to the present, the lighting device (consisting generally of an electrical incandescent lamp or of a plurality of such lamps) is disposed immovably in the outer tube, is attended by the drawback, that within the angular space available for observation through the window the illumination of the objects presented to the optical system varied according to the position of the latter. In the new tubular system the illuminating device is fixed to the inner tube. Hence the luminosity of each object observed is independent of the position of the optical system. Therefore with the new arrangement a comparatively small source of light will be found sufficient, even though the window occupies a considerable part of the circumference, nay the whole circumference of the outer tube.

The two poles of the lamp or system of lamps used will in general be connected to two portions of the inner tube, which are insulated from one another. A convenient manipulation of the instrument may be obtained by connecting one of the two connecting devices serving for coupling up the illuminating arrangement with a source of current with the outer tube and by so arranging the instrument that, on inserting the inner tube in the outer tube the circuit is closed by the outer tube contacting with one of the above-mentioned portions of the inner tube. Thus on inserting the inner tube into the outer tube the illuminating arrangement is automatically put in circuit and is automatically put out of circuit on the inner tube being pulled out.

In the constructional example of the invention, shown in the drawing, a tube $a$ is closed at one of its ends by a glass cap $a^1$ and thereby provided with a lateral window which runs right around it and turns into a central window. At its other end the tube is enlarged to form a funnel $a^2$. Two parts provided with holes, with which they embrace the outer tube, are fixed to this tube, one of them, $b^1$, being electrically connected to the said tube, and the other, which consists of two parts $b^2$ and $b^3$, being insulated from the tube and from the part $b^1$. Each of the said two parts bears a connecting terminal $b^4$. A tube $c$, which is inserted in the tube $a$, is provided at that one of its ends, which projects into the glass cap $a^1$, with a look-out opening $c^0$, while near its other end it rests with an annular extension $c^1$ against the funnel $a^2$. A part $c^2$ is fitted on the same end of the tube $c$, being rotatable about it and insulated from it, and bears a pin $c^3$, which passes through a slot $a^0$ in the funnel $a^2$ and engages a hole $b^0$ of the part $b^3$. An incandescent lamp $e$ is fixed in the tube $c$ in the immediate vicinity of the opening $c^0$; one of its poles, $e^1$, is electrically connected with the tube $c$; while its other pole, $e^2$, is connected by an insulated wire $e^0$ with the part $c^2$. If the two connecting terminals $b^4$ be connected up to the poles of a source of current, with the tubular system as shown in the drawing the lamp is in circuit. On the inner tube being pulled out of the outer one, the contact between the annular extension $c^1$ and the funnel $a^2$ is interrupted, so that by this means the lamp is put out of circuit. The uppermost part of an optical system is indicated by a reflecting prism $f$ and a lens $f^0$, shown in dotted lines.

I claim:

1. In a hysteroscope an outer tube, a lateral window at one end of this tube, an inner tube adapted for the reception of the parts of an optical system and to be pushed into and pulled out of the said outer tube and to be rotatable within the same, the said inner tube having a lateral opening at one end opposite the lateral window of the outer tube and an incandescent electric lighting system fixed to the inner tube.

2. In an instrument for inspecting cavities in the body an outer tube, a lateral window at one end of this tube, an inner tube adapted for the reception of the parts of an optical system and to be inserted in the said outer tube and to be rotatable within the same, the said inner tube having a lateral opening at one end opposite the lateral window of the outer tube, an incandescent electric lighting system fixed to the inner tube and means adapted to put the said lighting system into and out of circuit respectively, by the insertion and the withdrawal of the inner tube.

RUDOLF ILGNER.

Witnesses:
MARTA FRIESE,
EVIRD LAUSEL.